INVENTOR.
BRUCE R. WALSH

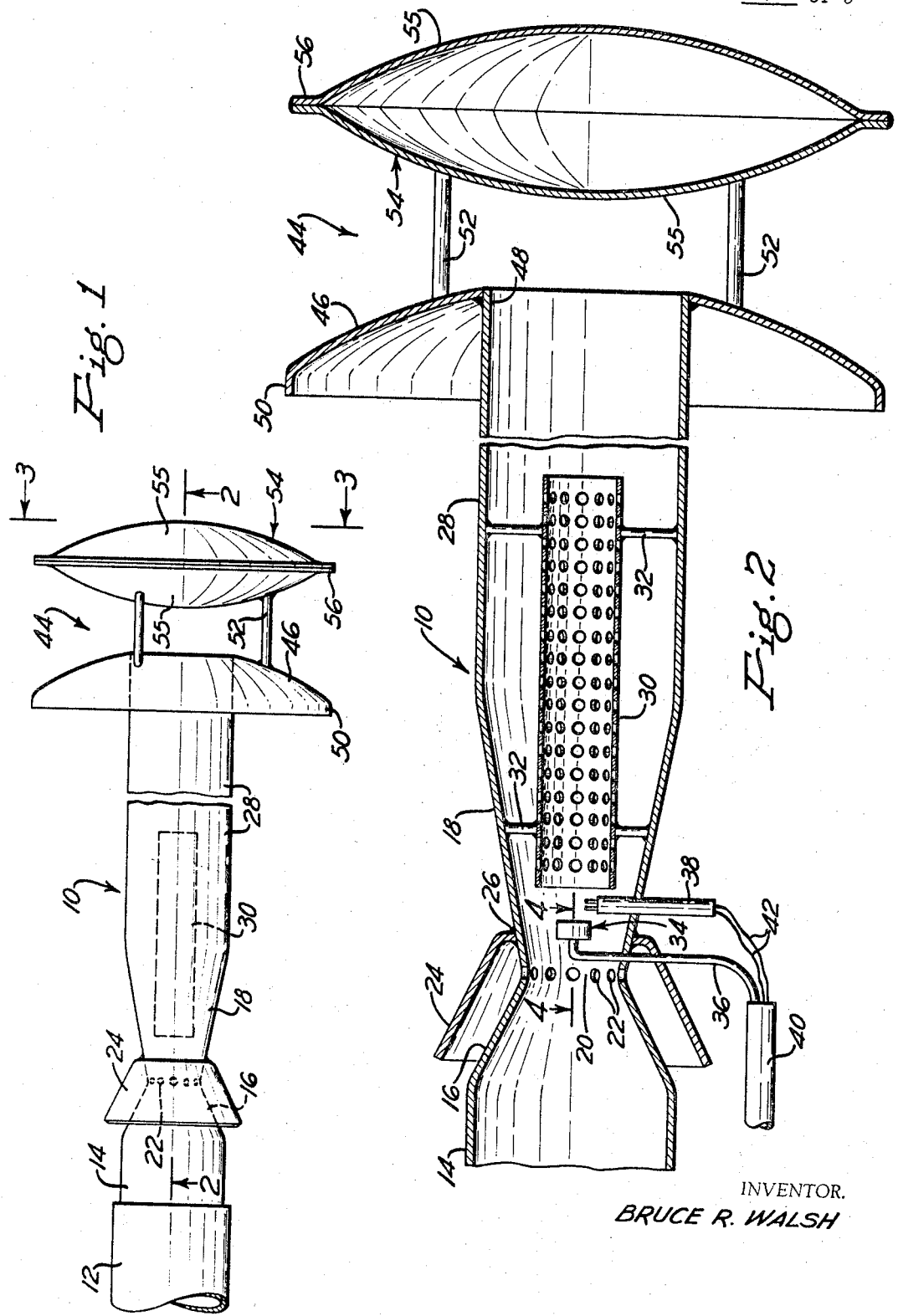

United States Patent Office

3,423,928
Patented Jan. 28, 1969

3,423,928
AFTERBURNER
Bruce R. Walsh, Wilkinsburg, Pa., assignor to Gulf Research & Development Company, Pittsburgh, Pa., a corporation of Delaware
Filed May 26, 1967, Ser. No. 641,600
U.S. Cl. 60—30   13 Claims
Int. Cl. F01n *1/14;* B01j *6/00*

ABSTRACT OF THE DISCLOSURE

A flame type afterburner comprising a perforated venturi throat to draw air into the stream of exhaust and a fuel nozzle positioned downstream from the venturi throat. The nozzle is of the fuel aspirating type, i.e., the passage of gases therethrough draws fuel into the nozzle. The invention includes vent means at the outlet of the afterburner adapted to utilize random air currents to create a reduced pressure zone at the outlet to aid drawing in both fresh air at the throat and fuel into the nozzle.

---

Figure 3:
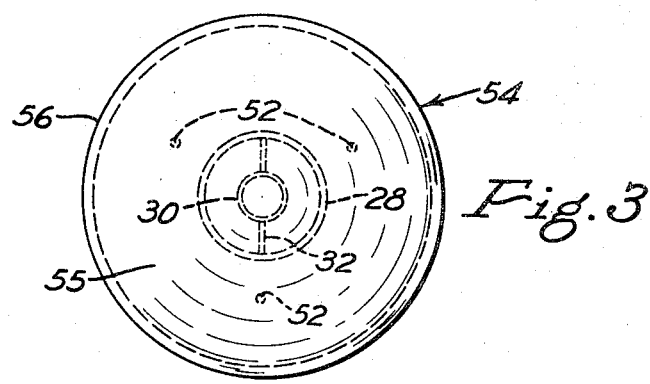

This invention relates to an afterburner for use with internal combustion engines for purposes of eliminating smoke, soot, and other noxious components of internal combustion engine exhaust.

Devices to accomplish the above purpose fall into two general classes. These classes are; devices that operate by chemical means, and devices that operate by means of a flame that consumes them. Chemical type afterburners suffer from a several disadvantages; they are relatively expensive, relatively heavy, require maintenance to revitalize the chemical beds therein, and establish a substantial back pressure through the exhaust system on the engine, which consumes power and reduces engine efficiency.

The present invention is of the second type and utilizes the principle of burning the exhaust, in combination with several other features, explained below, to produce a "clean" exhaust. Flame type afterburners have the advantage that almost no maintenance is required, and that all carbon particle impurities such as smoke and soot, as well as most other impurities, such as carbon monoxide, are removed from the exhaust before it is expelled into the atmosphere.

The present invention comprises the combination of several features which in concert yield these advantages. For purposes of assuring that the burning of the fuel supplied to the afterburner does not itself produce additional impurities over and above those already present in the exhaust, a fuel aspirating nozzle having means to supply the exact amount of fuel required by any particular flow of engine exhaust is provided. This nozzle is of the aspirating type and operates without any additional pressure means to force the fuel through the nozzle. The nozzle is positioned in the afterburner in the flow path of the exhaust therethrough. The flow of exhaust itself draws or pulls the correct amount of fuel into the flame, and the amount of fuel drawn in is dependent upon the rate of flow of the exhaust. This nozzle, in addition to providing the advantage of improved combustion, also makes the afterburner of the present invention more economical to make and maintain than other afterburners, in that no pressure system to supply either air or fuel is needed.

The absence of a separate air compressor is a material cost saving, and the elimination of a drain of compressed air from the engine increases the overall efficiency of the vehicle, both from performance and cost viewpoints.

Another element of the present invention which aids in more complete combustion is the provision of means in the afterburner body to admit ambient air into the flow of exhaust through the afterburner at a rate proportional to the rate of flow of exhaust. The inclusion of this ambient air further assures the presence of sufficient oxygen for total and complete combustion of the exhaust and the fuel supplied to the afterburner to achieve the above mentioned advantages.

In combination with the above two elements the afterburner of the present invention is also provided with vent means that, in cooperation with both the means to draw fresh air into the flow stream of the exhaust and the fuel aspirating nozzle, further increases the efficiency of burning of both the exhaust and the fuel supplied to the afterburner. The vent means create a reduced pressure zone at the outlet of the afterburner, which increases the efficiency of operation of both the nozzle and the fresh air means. The vent means also prevent random drafts from creating back pressure on the engine.

Figure 4:
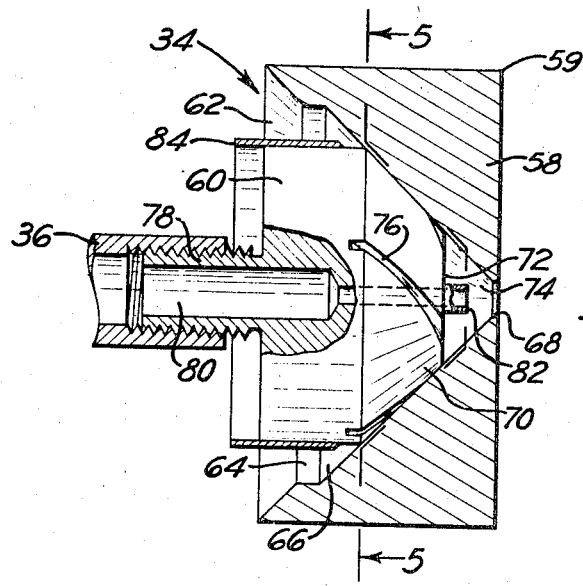
Figure 5:
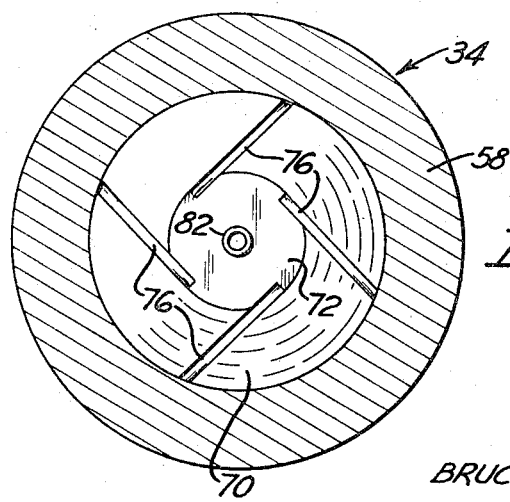
Figure 6:
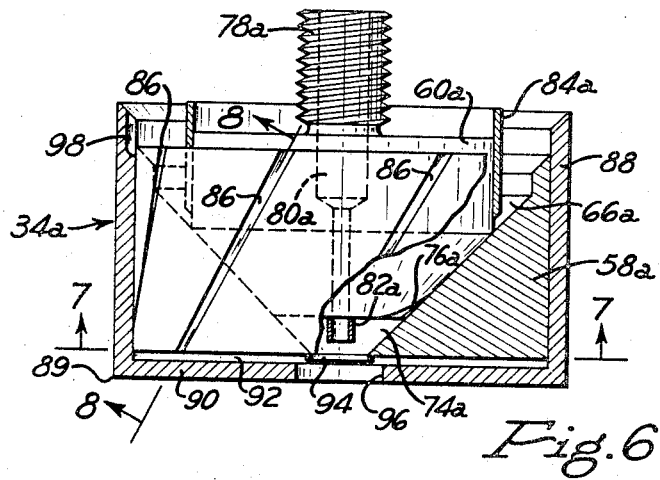
Figure 8:
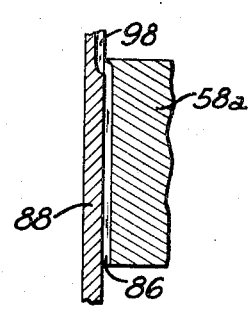
Figure 7:
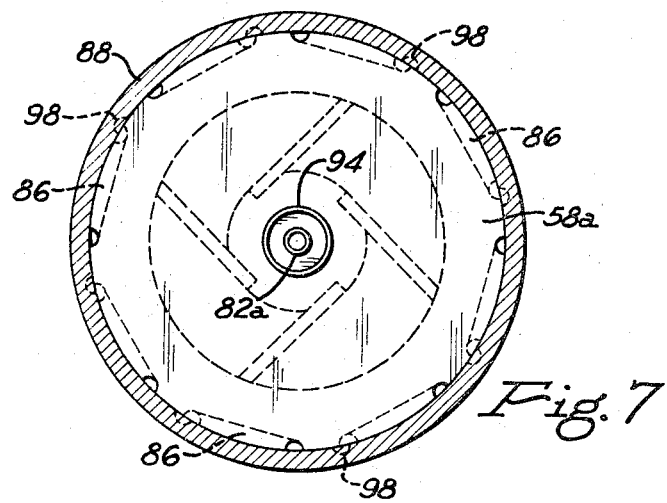
Figure 9:
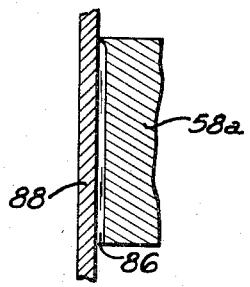
Figure 10:
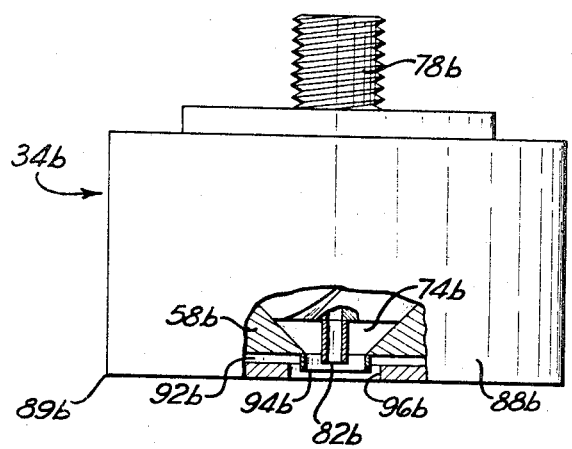

In the accompanying drawing forming a part of this disclosure: FIG. 1 is an external view of an afterburner embodying the invention; FIG. 2 is a longitudinal cross-sectional view taken on line 2—2 of FIG. 1; FIG. 3 is an external end view of the afterburner of the invention looking in the direction of arrows 3—3 in FIG. 1; FIG. 4 is a cross-sectional view of the nozzle taken on line 4—4 of FIG. 2; FIG. 5 is a cross-sectional view taken on line 5—5 of FIG. 4; FIG. 6 is a cross-sectional view similar to FIG. 4 showing a second embodiment of the nozzle; FIG. 7 is a cross-sectional view taken on line 7—7 of FIG. 6; FIG. 8 is a fragmentary cross-sectional view taken on line 8—8 of FIG. 6; FIG. 9 is a view similar to FIG. 8 showing the same parts in a different positional relationship; and FIG. 10 is a partially broken away external view of a third embodiment of a nozzle.

Referring now in detail to the drawing, 10 designates an afterburner embodying the invention. Afterburner 10 is shown attached to an exhaust pipe 12 of an internal combustion engine, which may be on a vehicle or stationary. It will also be understood that the exhaust pipe 12 and afterburner 10 may be disposed horizontally, as in an automobile or other relatively small vehicle, or vertically, as in a stationary engine or a large diesel vehicle, or in any other attitude.

Afterburner 10 comprises a cylindrical inlet portion 14. For the sake of convenience in this description, the right side, in FIGS. 1 and 2, shall be designated the rear end. Rearwardly of portion 14, afterburner 10 comprises a rearwardly and inwardly tapered portion 16, whose rear end is joined to a rearwardly and outwardly tapered portion 18. The juncture between portions 16 and 18 comprises a throat portion 20. A row of openings 22 are formed in throat portion 20.

Disposed on the outside of rearwardly and outwardly tapered portion 18 adjacent throat 20, is an air scoop or guard 24. Air scoop 24 is joined to afterburner 10 by tack welds 26, but this member is optional for reasons that will be explained in the "operation" section below.

Rearwardly of portion 18, afterburner 10 comprises a cylindrical outlet portion 28. Outlet portion 28 is shown broken to indicate the fact that its length is variable dependent upon practical considerations such as the distances between the exhaust pipe 12 and the area at which it is desired to vent the exhaust, and the like. However, it is desirable that portion 28 not be so long as to constitute a restriction to the flow of gases through the afterburner.

Located within tapered portion 18 and outlet portion 28 is a flame holder 30, which is supported within the afterburner by struts 32, or by any other suitable means. Flame holder 30 comprises a perforated tube of a suitable metal, and its operation will be explained below.

Means are provided to supply fuel to the stream of exhaust gases passing through the afterburner, and to ignite and burn this fuel and the exhaust within the afterburner. To this end, a nozzle 34, supported on a fuel supply pipe 36 which passes through the wall of portion 18, is positioned at the front end of flame holder 30. Ignition means 38, of any conventional type, are supported on portion 18, with the active elements, usually spark electrodes, positioned between nozzle 34 and the front end of flame holder 30. A conduit 40 is provided to protect pipe 36 and the electrical wires 42 for ignition means 38 to their points of supply, not shown. It will be understood that depending upon the nature of the engine, the nature of the installation, and other factors, that these points of supply may be an electric battery, the vehicle or engine electrical system, the fuel tank for the engine, an oil sump, or the like, well known to those skilled in this art.

Afterburner 10 comprises a venting assembly 44 at the rear end of outlet portion 28. Assembly 44 comprises a first disc member 46 formed with a central opening 48 which receives the rear end of outlet portion 28, and is joined thereto by any suitable means such as braising or welding. Disc 46 is curved in a plane perpendicular to the axis of the afterburner, comprises a portion of a surface of a sphere, and is provided with a strengthening annular outer end flange 50. Three strut members 52 extend axially from disc 46 and support a second disc assembly 54 in spaced relation to first disc 46. Second disc 54 is a composite member and comprises a pair of dish-like elements 55 joined together at their edge portions 56 by rivets, welds or the like, with their concave sides face to face. If desired, first disc member 46 could be made as a composite member similar to second disc assembly 54.

Thus, a space having the shape of a round double concave lens is created between the discs 46 and 54, with the end of outlet portion 28 at the thinnest part of the space. The operation will be explained below.

Referring to FIGS. 4 and 5, nozzle 34 is shown in detail. Nozzle 34 comprises a nozzle body 58 and a nozzle swirl stem 60. Nozzle body 58 is provided with a sharp corner 59 at its outside edge, for a reason that will appear in the "operation" section below. Stem 60 and body 58 are joined together by silver soldering or any other suitable means in a manner so as not to interfere with the swirl slots in the stem.

Body 58 is formed with a front end enlarged opening 62, which is joined to a short cylindrical portion 64. From cylindrical portion 64, body portion 58 is formed with a tapered cavity 66 that extends to just short of the rear end surface of body 58, and is joined thereto by a short cylindrical throat or orifice 68.

Stem 60 is formed with a tapered face 70 which is shorter in axial length than cavity 66, and fits therein so that the rear face 72 of stem 60 is positioned in frontwardly spaced relation to orifice 68. Thus, a swirl chamber 74 is created between orifice 68 and face 72 of stem 60. Face 70 of stem 60 is formed with four swirl slots 76 that extend from the front cylindrical portion of the stem to swirl chamber 74.

Stem 60 is formed with a stud 78 formed with external screw threads which mate with suitably formed internal threads on the end of pipe 36. A through stepped opening 80 extends through stud 78 and stem 60. A short tube 82 extends from the small end of opening 80 at face 72 to extend the fuel opening into swirl chamber 74. Means are provided to control the amount of air which will be drawn through swirl slots 76. To this end, a sleeve 84 snugly fits the cylindrical portion of stem 60 and is adjustable thereon to selectively open more or less of the inlet ends of the swirl slots to the air and exhaust gases entering the nozzle through openings 62 and 64.

Referring to FIGS. 6 through 9, there is shown a second embodiment of the nozzle 34a. Parts of nozzle 34a similar to parts described above in regard to nozzle 34 are indicated by the same reference numerals followed by "a." In nozzle 34a, the outside of cylindrical stem 60a is formed with a second set of swirl slots 86. Nozzle 34a also comprises an outer casing 88 which fits snugly over the outside cylindrical surface of stem body 58a, and has its rear wall 90 in spaced relation to the rear surface of stem 60a, to thereby provide a second swirl chamber 92 therebetween. A short piece of tubing 94 extends from the exit end of swirl chamber 74a. Tubing 94 serves in place of orifice 68 of nozzle 34, and serves to locate the exit orifice of swirl chamber 74a in swirl chamber 92. Wall 90 of casing 88 is provided with an orifice 96 aligned with tubing 94 but larger than said tubing. Orifice 96 is a thin disc, sharp-edged orifice. The inside inlet end of casing 88 is formed with a plurality of short axial slots 98. Referring to FIG. 7, a number of slots 98 equal to the number of swirl slots 86 are provided, and the slots 98 are spaced from each other by distances equal to the spacing of the inlet ends of the swirl slots 86. FIGS. 8 and 9 are discussed in the "operation" section below.

In FIG. 10 there is shown a nozzle 34b which is a slightly modified version of nozzle 34a shown in FIGS. 6 through 9, and in which the only changes are that tubing 82b of nozzle 34b extends all the way through the swirl chamber 74b, and that tubing 94b extends through swirl chamber 92b and terminates within orifice 96b. All other parts of nozzle 34b are the same corresponding parts of nozzle 34a and are not numbered, and it will be understood that the designation "b" following a reference numeral indicates the analogous part of nozzle 34b described above in regard to nozzles 34 and 34a.

*Operation*

Referring to FIGS. 1 and 2, the exhaust from the engine with which afterburner 10 is associated passes through exhaust pipe 12 and inlet portion 14 of the afterburner. The speed of the exhaust is then increased as it passes through tapered portions 16 and 18. This creates an area of reduced pressure at throat portion 20 due to the venturi effect. The zone of reduced pressure at the throat draws ambient air into the exhaust stream through openings 22.

It is significant that the air is drawn to the exhaust gases before or upstream from the nozzle. This is an advantage in that the exhaust gases are thereby diluted with air before being burned, the net result of which is that more of the exhaust gases are consumed in the flame. By drawing in fresh air upstream from the nozzle, sufficient air is provided for combustion, to thereby completely burn the exhaust.

Scoop or guard 24 surrounding openings 22 is provisional because when the afterburner is used in a horizontal position on a vehicle, and when the forward velocity of the vehicle is less than the velocity of the wind in the opposite direction, a suction condition could be created between the inside of the scoop and the outside of tapered portion 16 which would work against the drawing effect at the venturi throat 20. However, the guard 24 is desirable to have in installations where the engine is stationary, and/or where the afterburner is disposed substantially vertically, since it serves the purpose of physically protecting the row of openings 22, and also tends to prevent exhaust from the exit end of the afterburner from being drawn into the openings 22. The scoop or guard 24 may be fabricated with hinges and latches so that it may be easily removed or applied. The tack welds shown are merely exemplary.

After the air is mixed with the exhaust gases, the mixture passes around and through the nozzle 34. Any one of the three nozzles 34, 34a, or 34b may be used. The air, exhaust, and fuel mixture issuing from the nozzle is ignited by ignition means 38, and substantially all of the flame enters perforated flame holder 30. The provision of perforated flame holder 30 has the desirable effect of drawing any gases in the afterburner outside the flame holder through the perforations and into the flame as the burning gases pass through the flame holder. This aspiration of gases into the flame in the flame holder increases the amount of noxious elements in the exhaust which is burned, and also hastens removal of the products of combustion from the engine itself, thereby having a desirable effect on engine efficiency.

Venting assembly 44 serves several purposes. Since it is located across the exit end of outlet portion 28, it prevents random drafts from disrupting normal operation and movement of the gases in the afterburner. Further, venting assembly 44 utilizes such random drafts by directing most of them in directions transverse to the axis of the afterburner, and through the space between the two discs. When such breezes pass between the discs, they create a venturi effect at the narrowest portion thereof which draws the products of combustion leaving the afterburner into such random breezes. Any random draft whose direction is parallel to the axis of the afterburner will create a reduced pressure zone at the outside of assembly 44, which also tends to draw gases out of outlet portion 28. Thus, all random drafts regardless of direction are utilized. The venturi in the vent assembly has a scavenging effect on the afterburner, and has an indirect effect on the efficiency of operation of the engine, similar to the operation of the perforations in flame holder 30. This scavenging effect acts in concert with the venturi effect at throat 20 to increase the amount of air drawn in through openings 22, further increasing the advantages flowing from inclusion of fresh air upstream from the nozzle, as explained above. The struts 52 are thin and spaced about 120° apart and present a negligible resistance to air from any direction.

All three nozzles 34, 34a, 34b are fuel aspirating, i.e., utilize a suction force created by the movement of fluid through the nozzle to draw fuel into the nozzle, thereby eliminating the need for any additional pressure means to force fuel through the nozzle. This in and of itself is a substantial advantage for the afterburner of the present invention in that it eliminates separate pressure means for the fuel, thereby simplifying manufacturing and maintenance for the afterburner as a whole, to thereby effect substantial economies.

Nozzle 34 is the simplest of the nozzles shown, and therefore will be described first.

Some of the mixture of air and exhaust gases passing through afterburner 10 enters the nozzle at large opening 62, then passes through swirl slots 76, and passes on into swirl chamber 74 at which time the velocity of the mixture has been increased because of the decreasing diameter of the swirl stem, and is swirling because of the swirl slots. The remainder of the air and exhaust mixture which does not pass through the nozzle passes around the outside of the nozzle, and encounters sharp corner 59. The provision of sharp corner 59 causes the mixture passing thereover to create a region of reduced pressure at exit throat 68, which increases the exist velocity of the air, exhaust gas, and fuel mixture from the swirl chamber, which further enhances atomization of the fuel, to further enhance burning efficiency. The provision of a sharp corner to achieve this advantage is common to all three nozzles 34, 34a, 34b. The high velocity swirling mixture migrates to the wall of the swirl chamber 74, and thereby creates a low pressure zone within the swirl chamber at the outlet end of tubing 82, which draws the fuel through pipe 36, stepped opening 80 and tube 82. The swirling high velocity mixture of air and exhaust gases draws fuel into itself forwardly of the outlet end of tubing 82. As the new mixture of air, exhaust gases and fuel passes through cylindrical throat 68, centrifugal force of the swirling mass causes the fuel to atomize into very small droplets and causes the mixture to spray outwardly in a finely dispersed spray, thus achieving thorough and complete combustion when the spray is later ignited by ignition means 38. Sleeve 84 is slidably adjusted axially of the cylindrical portion of stem 60 to selectively control the size of the inlets of swirl slots 76, to thereby control the amount of air and exhaust mixture passing through the nozzle.

Tubing 82 extends axially to a position between the ends of swirl chamber 74. This structure assures that the fuel drawn through tubing 82 will be drawn into the swirl chamber after the air and exhaust mixture has established a definite helical movement. The helical pattern of motion creates a central vacuum condition vortex which will draw the fuel into the vortex. Thus, the provision of tubing 82 insures the vacuum condition is definitely created before the mixture migrates to the region of the outlet end of the fuel supply, i.e., tubing 82.

Were tubing 82 not provided, the outlet end of the fuel duct would be located at face 72 of stem 60. It is highly doubtful that nozzle 34 would operate under this condition because some of the air and exhaust mixture exiting from the swirl slots 76 might traverse face 72 instead of establishing a helical motion on the outside of the swirl chamber, to thus interrupt or at least seriously disturb atomization of the fuel. A chain reaction would establish itself and swirling and the resultant atomization would be destroyed.

Testing has shown that the outside surface of tubing 82 should be cylindrical, as shown, to achieve efficient operation. A conical or hemispherical shape, with the base against surface 72, was found inoperative in that it would not permit sufficient fuel to be aspirated to discharge a combustible mixture from the nozzle. The reason for this is thought to be that these other external shapes tend to direct some of the mixture transversely across the axis of the tube to destroy the normal flow of the fuel into the vacuum within the swirl chamber forwardly of the exit end of the tubing.

Adjustment of sleeve 84 will regulate the amount of air and exhaust mixture entering the swirl slots 76 and this amount of mixture will in turn regulate the amount of fuel aspirated through the nozzle. This structure within the nozzle yields an advantage in the afterburner of the present invention, in that by controlling the amount of fuel burned in the afterburner, the problem of the afterburner itself adding to rather than reducing the amount of noxious elements in the exhaust of the afterburner is eliminated. If desired, various, means, not shown, may be used to remotely control the position of sleeve 84 from some remote location, such as the cab of a vehicle or a control panel.

In nozzles 34a and 34b, a double swirl chamber structure is provided. A double swirl chamber is advantageous because additional air and exhaust mixture is swirled into the already swirling fuel, air, and exhaust mixture issuing from the first swirl chamber, to thereby further enhance the atomization of the fuel, to further enhance efficiency of burning.

Referring to nozzle 34a shown in FIGS. 6 through 9, the mixture in second swirl chamber 92 is supplied thereto by the swirl slots 86 on the outside cylindrical surface of nozzle body 58a, and this mixture migrates towards orifice 96 in a plane transverse to the axis of the nozzle. The tubing 94 serves the same purpose as tubing 82a, in that it prevents the mixture in swirl chamber 92 from traveling transversely across the gases exiting from the first swirl chamber 74a.

Means are provided to control the amount of air and exhaust mixture supplied to second swirl slots 96. To this end, the inside cylindrical surface of outer casing 88 is formed with a plurality of slots 98, as described above. By rotating the casing 88 with respect to the body 58a, full communication, as shown in FIG. 8, between slots 98 and swirl slots 86 can be established, or no communication, as shown in FIG. 9, between these two sets of slots is possible, if it should be desired to cut off the supply of mixture to the second swirl chamber 92. Any degree of adjustment is possible between the extremes of FIG. 8 and FIG. 9, and remote control could be provided if desired.

Nozzle 36b shown in FIG. 10 is similar to nozzle 34a in all respects except that tubing 82b is elongated and extends to a point within tubing 94b. Tubing 94b is also elongated and extends to a point within orifice 96b.

In nozzle 34b there is no mixing of the fuel with the air and exhaust mixture in the first swirl chamber 74b. The provision of the two elongated tubings 82b and 94b causes substantially all the mixing to be done at or outwardly of the orifice 96b. It is thought that supplying a relatively large volume of swirling gases in two streams substantially at one point results in increased atomization of the fuel and more vigorous admixing thereof to result in improved burning.

In both nozzles 34a and 34b, thin disc, sharp-edged orifices 96 and 96b serve to create a vena contracta in the second swirl chamber flow streams, which serves to thoroughly mix the gases exiting from swirl chambers 92 and 92b, respectively, into the mixture issuing from the respective first swirl chambers, to result in more complete combustion.

While the invention has been described in detail above, it is to be understood that this detailed description is by way of example only, and the protection granted is to be limited only within the spirit of the invention and the scope of the following claims.

I claim:
1. In an afterburner, the combination comprising an inlet portion, an outlet portion, and an intermediate portion joining said inlet and outlet portions, said intermediate portion including a reduced cross-sectional area throat portion, said throat portion being formed with a row of openings therein, whereby a fluid passing through said afterburner will create a region of reduced pressure at said throat and row of openings to draw outside air through said openings and into said fluid, a fuel nozzle, means to position said nozzle in said afterburner between said throat portion and said outlet portion, said nozzle comprising means to pass a portion of said fluid through said nozzle and means to cause the passage of said fluid through said nozzle to draw fuel from a fuel source into the fluid passing through said nozzle, and ignition means in closely spaced relation to the outlet of said nozzle.

2. The combination of claim 1, vent means at the outlet end of said outlet portion, and said vent means being adapted to utilize ambient air currents to create a reduced pressure zone at the outlet end of said outlet portion.

3. The combination of claim 2, said vent means comprising means to direct substantially all ambient air currents through said vent means transversely to the axis of said outlet means to further reduce the pressure at said reduced pressure zone at the outlet end of said outlet portion.

4. The combination of claim 2, said vent means comprising first convex disc means formed with a central opening to receive the outlet end of said outlet portion, second convex disc means in spaced relation to said first convex disc means, means to hold said second convex disc means in said spaced relation to said first convex disc means, and means to mount the assembly of said first and second convex disc means on said outlet end of said outlet portion.

5. The combination of claim 1, flame holder means, said flame holder means comprising an elongated length of perforated tubing, means to mount said tubing within said afterburner between said nozzle and the outlet end of said outlet portion, whereby the flame issuing from said nozzle will be substantially contained within said tubing, whereby said flame within said tubing will draw fluids outside said tubing and within said afterburner inside of said tubing and into the flame.

6. The combination of claim 1, an air guard, means to mount said guard on said intermediate portion, said guard extending over said throat portion and away from said outlet portion, whereby said guard protects said row of openings and causes the reduced pressure within said throat portion to draw air through said openings from regions spaced from said outlet portion.

7. The combination of claim 1, said fuel nozzle comprising an outlet face disposed transversely to the direction of fluid motion through said nozzle and said afterburner, said nozzle comprising a sharp edge at the outermost portion of said outlet face, whereby the fluid passing through said afterburner outside of and adjacent to said sharp edge will create a reduced pressure at said outlet face of said nozzle.

8. The combination of claim 1, said nozzle comprising at least one swirl chamber, said swirl chamber being of a generally truncated conical shape, said nozzle comprising at least one swirl means adapted to direct a portion of the fluid within said afterburner passing through said nozzle to said swirl chamber to create a swirling mass of said fluid on the outside tapered wall on said swirl chamber and a zone of reduced pressure within said swirling mass, and said nozzle comprising fuel supply means comprising means to position the outlet thereof within said swirl chamber at a position spaced from the inlet end of said swirl chamber towards said outlet portion.

9. The combination of claim 8, said nozzle comprising means to selectively adjust the amount of said fluid supplied to said swirl chamber.

10. The combination of claim 8, said nozzle comprising a second swirl chamber, means to divide the fluid passing through said nozzle into a first stream and a second stream, means to direct said first stream to said first swirl chamber, means to direct said second stream to said second swirl chamber, and means to direct said second stream into said first stream after said first stream exits from said first swirl chamber.

11. The combination of claim 10, said nozzle comprising first and second individually adjustable means to adjust the volumes of said first and second streams directed to said first and second swirl chambers, respectively.

12. The combination of claim 1, said nozzle comprising first and second swirl chambers, means to divide the fluid passing through said nozzle into a first stream and a second stream, means to direct said first stream to said first swirl chamber, means to direct said second stream to said second swirl chamber, said nozzle comprising fuel supply means, said fuel supply means terminating within said first swirl chamber, whereby the swirling first stream within said first swirl chamber draws fuel into itself and the swirling first stream and the fuel is combined with the swirling second stream issuing from said second swirl chamber after said first stream and the fuel are combined.

13. The combination of claim 1, said nozzle comprising first and second swirling chambers, means to divide the fluid passing through said nozzle into a first stream and a second stream, means to direct said first stream to said first swirl chamber, means to direct said second stream to said second swirl chamber, said nozzle comprising fuel supply means and means to substantially simultaneously combine the swirling first stream issuing from said first swirl chamber, the swirling second stream issuing from said second swirl chamber, and the fuel from said fuel supply means.

References Cited

UNITED STATES PATENTS

| | | | |
|---|---|---|---|
| 1,839,879 | 1/1932 | Hyatt | 60—30 |
| 2,747,976 | 5/1956 | Houdry | 60—30 |
| 2,873,815 | 2/1959 | Swayze | 60—30 |
| 3,218,134 | 11/1965 | Walsh | 60—30 |
| 3,332,231 | 7/1967 | Walsh | 60—30 |

FOREIGN PATENTS 1,128,505  8/1956  France.

MARTIN P. SCHWADRON, *Primary Examiner.*

DOUGLAS HART, *Assistant Examiner.*

U.S. Cl. X.R.

23—277